Patented Apr. 18, 1933

1,903,891

UNITED STATES PATENT OFFICE

WALTER BRUCK, OF MANNHEIM, GERMANY, ASSIGNOR TO GENERAL ANILINE WORKS, INC., OF NEW YORK, N. Y., A CORPORATION OF DELAWARE

HALOGENATED ANTHRAQUINONEACRIDONES AND THE PROCESS OF MAKING SAME

No Drawing. Application filed October 10, 1929, Serial No. 398,820, and in Germany October 27, 1928.

The present invention relates to the production of anthraquinoneacridones containing chlorine and bromine.

I have found that anthraquinoneacridones which contain bromine and chlorine, are particularly valuable vat dyestuffs and that the said bromochloroanthraquinoneacridones are very easily obtained by treating an anthraquinoneacridone containing one of the said halogens with a halogenating agent supplying the other halogen. The anthraquinoneacridones containing one of the said halogens may be produced in any known manner, for example, synthetically by condensation of α-chloranthraquinone with a halogenated anthranilic acid and ring closure to the acridone, or by the action of a halogenating agent on anthraquinoneacridones. The halogenation is suitably carried out in organic diluents, such as nitrobenzene, trichlorobenzene and the like, and preferably with the aid of halogenating catalysts, such as sulphur, iodine, metals or metal salts. As the anthraquinoneacridones containing only one of the said halogens employed as initial materials may be produced by the action of a halogenating agent on anthraquinoneacridones, my invention provides also a method of producing the anthraquinoneacridones containing two different halogens in one operation by the simultaneous action of chlorinating and brominating agents.

Generally speaking the products thus obtainable are characterized by excellent fastness to light. Particularly valuable are the products containing only a single atom of bromine and from 1 to 2 atoms of chlorine.

The following examples will further illustrate the nature of this invention but the invention is not restricted to these examples. The parts are by weight.

Example 1

101 parts of monobromoanthraquinoneacridone which is probably a mixture of Bz3- and Bz5-monobromoanthraquinoneacridone corresponding to formulæ:

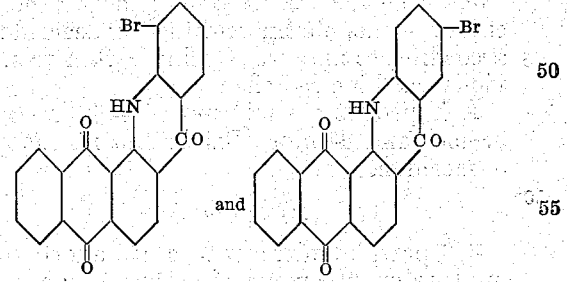

(obtainable by treating anthraquinoneacridone in nitrobenzene with bromine dissolved in nitrobenzene at about 110° to 120° centigrade) and 1.3 parts of iodine are stirred in 780 parts of nitrobenzene. About 170 parts of sulphuryl chloride are then allowed to run in at a temperature of from 90° to 100° centigrade during a period of about 4 hours, and the whole is then stirred for about 3 hours longer at the same temperature. After cooling, the product is filtered off by suction and washed with nitrobenzene; the crystalline filtered material is then treated with steam and dried. Analysis shows that 2 atoms of chlorine have been taken up.

The product is probably a mixture of 4.Bz5-dichloro-Bz3-bromo- and 4.Bz3-dichloro-Bz5-bromoanthraquinoneacridone.

The product crystallizes from nitrobenzene in red-violet needles. The color of the solution in concentrated sulphuric acid is orange red. It gives a violet vat with hydrosulphite. On cotton bluish red dyeings are first obtained, and these are changed to red violet by treatment with a boiling solution of soap.

Example 2

A mixture of 101 parts of monobromoanthraquinoneacridone and 1.3 parts of iodine is stirred with 780 parts of nitrobenzene. Then about 73 parts of chlorine are passed in at a temperature of from 90° to 100° centigrade during a period of about 7 hours.

The whole is then kept at the same temperature for about 2 hours longer and is then allowed to cool. The further working up is carried out as described in Example 1. The product obtained corresponds as regards its properties with the product obtained in Example 1.

*Example 3*

36 parts of 4-chloroanthraquinoneacridone (see Liebigs Annalen 381, page 22) are suspended in 850 parts of nitrobenzene. A solution of 25 parts of bromine in 250 parts of nitrobenzene is added to the said suspension which has been warmed to 100° C. The reaction mixture is stirred for about 2 hours at the said temperature which is then raised in the course of 2 hours to the boiling point. The whole is then allowed to cool and the reaction product separated in the form of red violet acicular needles which are filtered off. The reaction product may be recrystallized from trichlorobenzene and is a monochloro-monobromoanthraquinoneacridone according to analysis, dyeing cotton from a violet vat blue red shades.

It is probably a mixture of 4-chloro-Bz3-bromo- and 4-chloro-Bz5-bromoanthraquinoneacridone.

*Example 4*

600 parts of nitrobenzene are added to a mixture of 32.6 parts of anthraquinoneacridone and 1 part of iodine, a mixture of 18 parts of bromine, 30 parts of sulphuryl chloride and 30 parts of nitrobenzene being then run into the aforesaid mixture which has been warmed to about 95° C. in the course of about 1 hour. The whole is then stirred at the said temperature for 7 hours and allowed to cool. The product separated in crystalline form is a dibromo-monochloroanthraquinoneacridone dissolving in concentrated sulphuric acid to give an orange red solution and dyeing cotton from a violet vat blue red shades. The dyestuff may be recrystallized from trichlorobenzene.

What I claim is:—

1. A process of producing anthraquinoneacridones containing chlorine and bromine, which comprises causing an anthraquinoneacridone containing one of the said halogens to react with a halogenating agent selected from the group consisting of one of the said halogens which is different from that already present in the initial material, and agents supplying such halogen.

2. A process of producing anthraquinoneacridones containing chlorine and bromine, which comprises causing an anthraquinoneacridone containing one of the said halogens to react in an inert organic solvent with a halogenating agent selected from the group consisting of one of the said halogens which is different from that already present in the initial material, and agents supplying such halogen.

3. A process of producing anthraquinoneacridones containing chlorine and bromine, which comprises causing an anthraquinoneacridone containing one of the said halogens to react in an inert organic solvent in the presence of a halogenating catalyst with a halogenating agent selected from the group consisting of one of the said halogens which is different from that already present in the initial material, and agents supplying such halogen.

4. A process of producing anthraquinoneacridones containing chlorine and bromine, which comprises causing an anthraquinoneacridone to react with a chlorinating agent and a brominating agent selected from the group consisting of chlorine and bromine and agents supplying these halogens.

5. Monobromoanthraquinoneacridones containing from 1 to 2 atoms of chlorine and dyeing cotton from violet vats violet to violet red shades.

6. Dichloromonobromoanthraquinoneacridone dissolving in concentrated sulphuric acid to give an orange red solution and dyeing cotton from violet vat red violet shades.

In testimony whereof I have hereunto set my hand.

WALTER BRUCK.